May 18, 1948.  F. I. JOHNSON  2,441,575

COMBINATION OF CABINET AND ROTARY PHONOGRAPH SUPPORT

Filed March 22, 1943

Inventor:
Frank I. Johnson
By McCanna, Winterkorn & Morsbach
Attys.

Patented May 18, 1948

2,441,575

UNITED STATES PATENT OFFICE 2,441,575

COMBINATION OF CABINET AND ROTARY PHONOGRAPH SUPPORT

Frank I. Johnson, Rockford, Ill.

Application March 22, 1943, Serial No. 480,046

1 Claim. (Cl. 312—8)

This invention relates to a new and improved combination phonograph and radio cabinet.

The principal object of my invention is to provide improved facilities whereby the phonograph and automatic record changer are rendered more conveniently accessible but may, nevertheless, be neatly concealed within the cabinet when not in use. I am aware that drawer type supports have been provided, but they have been objectionable for several reasons, the principal ones being that the cabinet as a whole does not present a neat and sightly appearance with the drawer pulled out and the operating space afforded for putting records on the spindle or removing them is not adequate and the operation is, therefore, more or less awkward. Furthermore, the drawer will invariably tend to sag when pulled out and that, of course, adds to the unsightliness of the ensemble.

The salient feature of my invention is the rotary mounting of the phonograph support on a single downwardly extending supporting standard completely concealed in the horn compartment and turning in vertically spaced bearings that are located preferably in the top and bottom of said compartment so as to secure adequate spacing and proportionately greater rigidity of the phonograph support. The standard turns on a vertical axis located within but close to the front of the horn compartment under the phonograph compartment, so that in the inoperative position the phonograph support, which is of generally semi-cylindrical drum shape, is disposed wholly within the cabinet with the flat side thereof substantially flush with the front of the cabinet, and in the operative position the drum projects nearly its full dimension from the front of the cabinet and the top of the phonograph turn-table is therefore easily accessible and there is nothing to interfere with easily placing records on the spindle, although there is not enough of the drum projecting from the front of the cabinet to be objectionable, and there is no tendency toward sagging.

The invention is illustrated in the accompanying drawing, in which—

The same reference numerals are applied to corresponding parts throughout the views.

Figure 1:
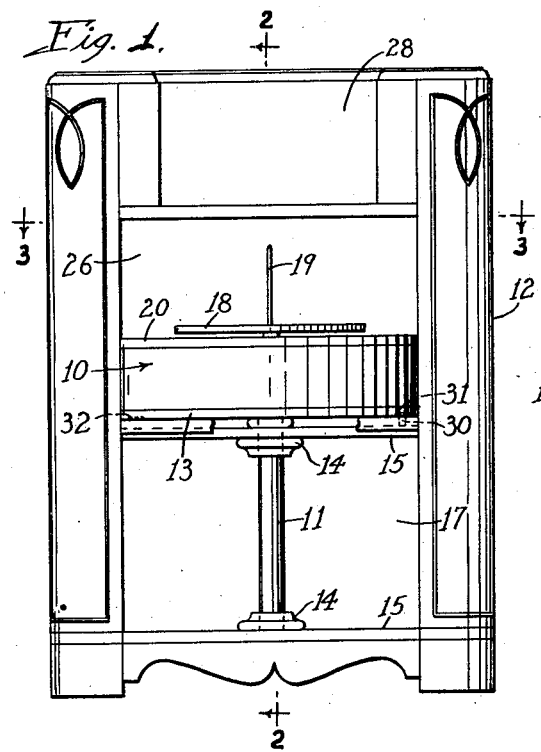
Fig. 1 is a front view of a combination phonograph and radio cabinet embodying my invention, the cabinet being shown with the phonograph support in the operative position, but with the lower grill removed to expose the standard on which the phonograph support revolves.

Referring to the drawing, the reference numeral 10 designates the drum type phonograph support of my invention, which is pivoted on a vertical axis on a single standard 11 located wholly beneath the drum and within the cabinet 12. The bottom 13 of the drum is rigidly secured in any suitable manner on top of the standard 11, and suitable bearings 14 are provided on transverse members 15 in the cabinet, the bearings being located adjacent the upper and lower ends of the standard for good support thereof, whereby to eliminate likelihood of the phonograph support tending to sag when it extends from the cabinet for use. A suitable, ornamental, cloth-backed grill may be provided for the lower front portion of the cabinet 12 for concealment of the standard 11, and the usual load speaker horn therebehind, the horn not being shown.

Figure 3:
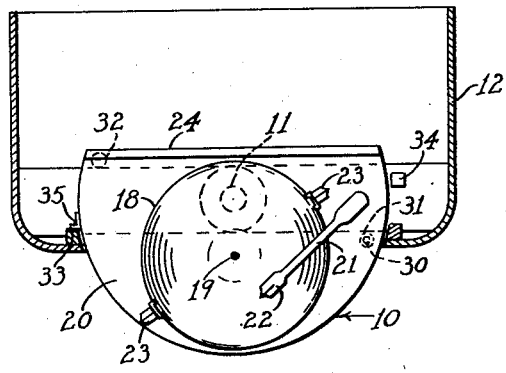
Fig. 3 is a horizontal section on the line 3—3 of Fig. 1.

The turntable 18 for support of the phonograph records with its elongated spindle 19 is disposed above the top 20 of the drum 10, and the usual drive mechanism is provided therefor inside the drum 10. 21 designates the tone arm, and 22 the reproducer, in Fig. 3, these parts being, however, omitted in the other figures. Any suitable or preferred record changing equipment may be provided in connection with the spindle 19 and tone arm 21, auxiliary supports for the reserve records being indicated at 23 in Fig. 3 but omitted in the other views. The upstanding screen 24 covering the flat side 25 of the drum 10 forms a closure for the open front of the phonograph compartment 26 when the drum is turned to the closed or inoperative position, shown in Fig. 4. Suitable detent means may be provided for releasably securing the drum in either of the two positions mentioned, as, for example, a spring pressed bullet type detent 30 fixed in the cabinet and cooperating with either of two keepers 31 and 32 spaced 180° apart on the bottom 13 of the drum 10. A pair of stops 33 and 34 are provided in the cabinet, approximately 180° apart, as shown, for engagement by a stop projection 35 provided on the periphery of the drum 10, inside the cabinet. This limits the turning of the drum to a half-turn, from one of its two positions to the other.

The upper compartment 27 in the cabinet is reserved for the radio receiver (not shown), including an audio-amplifier, and 28 is the radio control panel, although no dials have been shown, and, of course, the phonograph 21—22 includes the usual electrical translating device having operative connection with the audio-amplifier in the usual way. It is clear in Fig. 2 that with my improved construction the drum 10 is entirely independent of the audio-amplifier compartment 27 so far as its rotary support is concerned, and, hence, there is no problem in providing ample clearance between the upper end of the spindle 19 and the bottom of the compartment 27 forming the top of the phonograph compartment 26, so that records can be placed on the spindle easily.

Figure 2:
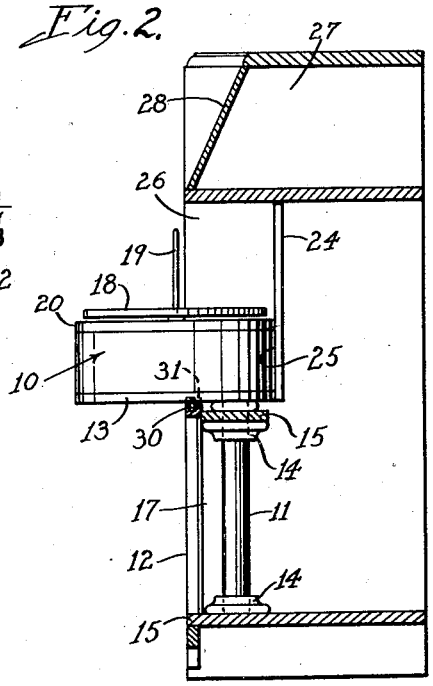
Fig. 2 is a vertical section on the line 2—2 of Fig. 1.
Figure 4:
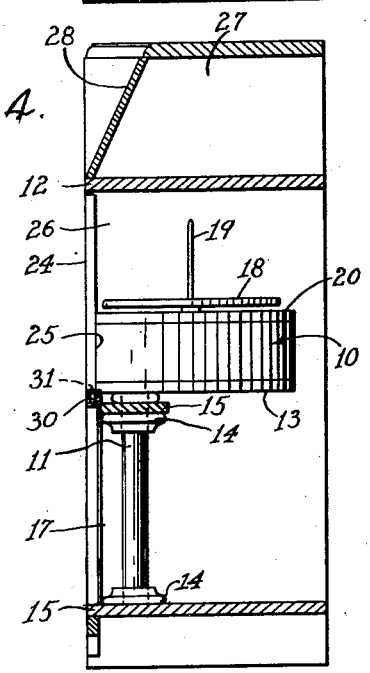
Fig. 4 is a vertical section like Fig. 2, but showing the phonograph support turned to closed position.

In operation, whenever the radio is being used alone, the drum 10 is disposed with the screen 24 closing the front of the phonograph compartment, as in Fig. 4. However, when phonograph records are to be played, the drum 10 is turned through 180° on the standard 11 as an axis to the position shown in Figs. 1, 2 and 3. In this position the semi-cylindrical portion of the drum projecting from the front of the cabinet presents a pleasing appearance, and it will, of course, be finished to harmonize with the finish and design of the rest of the cabinet to increase its attractiveness. The spindle under these conditions, as can easily be seen in Figs. 2 and 3, is disposed in a plane spaced out from the front of the cabinet, so that it is no problem to put phonograph records on or take them off. If desired, the operator may after placing the records on the spindle and starting the motor turn the drum back to the closed or inoperative position, so that the phonograph mechanism is out of sight and is not apt to be tampered with during the playing. The drum 10 may be turned from one position to the other with very little effort, there being much less frictional resistance to the turning of the standard 11 than is imposed between the relatively slidable parts of the old drawer type phonograph support.

It is believed the foregoing description conveys a good understanding of the objects and advantages of my invention. The appended claims have been drawn with a view to covering all legitimate modifications and adaptations.

I claim:

In combination, a cabinet provided with fixed front and side walls, said cabinet having a lower speaker compartment having top and bottom walls, a phonograph compartment thereabove, a hollow drum type phonograph support positioned in said phonograph compartment and having a height substantially less than the height of the phonograph compartment, said hollow drum type support being of generally semi-cylindrical shape having one flat side parallel to the vertical axis of the support, a front closure-forming wall for said phonograph compartment secured to the drum type support along the flat side thereof, a vertically disposed standard positioned within the lower compartment closely adjacent to the front wall thereof and extending from the top to the bottom of the lower compartment, said hollow drum type support being supported for rotation about its vertical axis by said standard; and a pair of vertically spaced bearings in the lower compartment one secured to the top wall in the lower compartment and the other to the bottom wall thereof and supporting for rotation said standard, said drum type support being adapted to rotate into and out of said phonograph compartment, said front wall carried by said hollow drum type support being adapted to form a closure for said phonograph compartment when said drum type support is rotated to lie wholly within said phonograph compartment.

FRANK I. JOHNSON.

REFERENCES CITED

The following references are of record in the file of this patent:

UNITED STATES PATENTS

| Number | Name | Date |
|---|---|---|
| D. 127,155 | Harman | May 13, 1941 |
| D. 131,055 | Bennett | Jan. 13, 1942 |
| 442,202 | Ritchie | Dec. 9, 1890 |
| 1,226,301 | Brexendorf | May 15, 1917 |
| 2,078,552 | Young | Apr. 27, 1937 |
| 2,094,246 | Snomala | Sept. 28, 1937 |
| 2,346,914 | Drucker | Apr. 18, 1944 |

FOREIGN PATENTS

| Number | Country | Date |
|---|---|---|
| 163,943 | Switzerland | 1933 |
| 313,553 | Italy | Dec. 29, 1933 |